Nov. 11, 1930.  E. H. GOLD ET AL  1,781,457
FLEXIBLE PIPE STRUCTURE
Filed Oct. 29, 1927  3 Sheets-Sheet 1
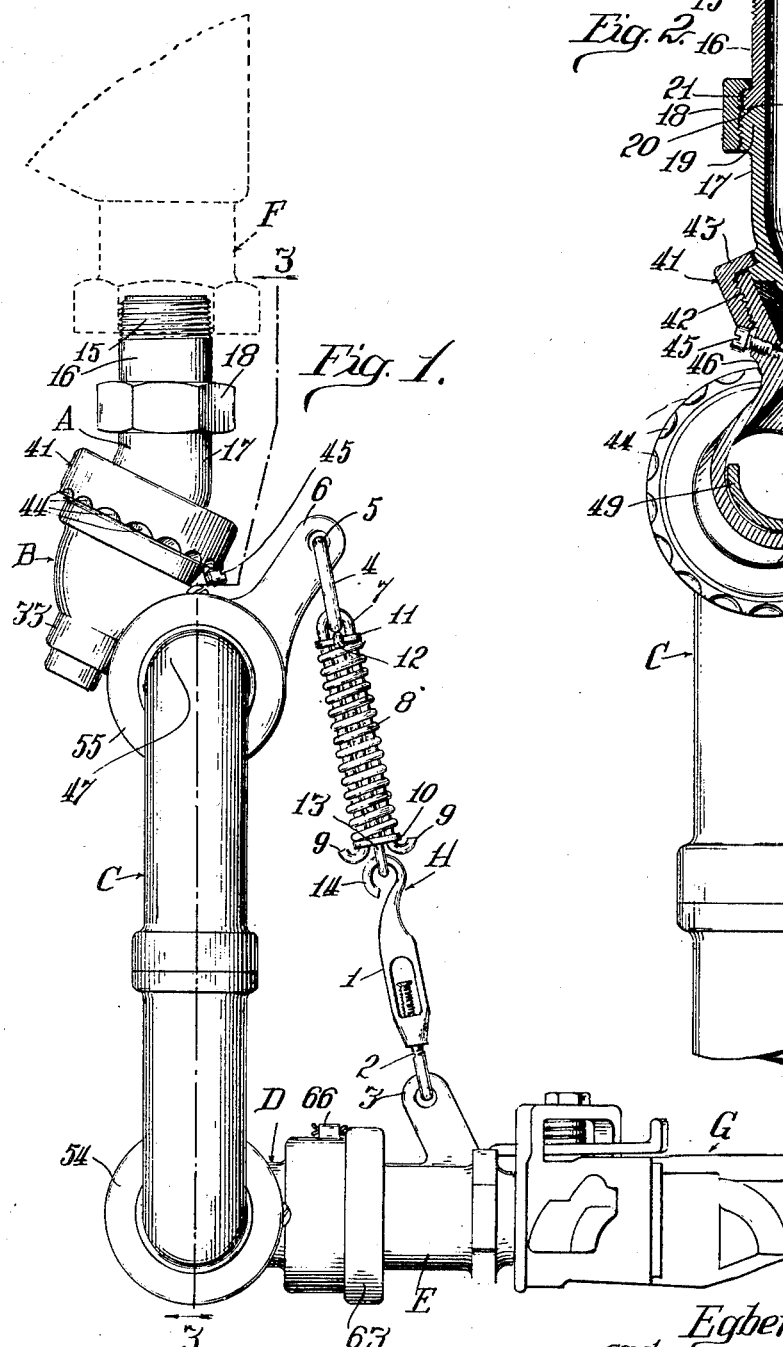
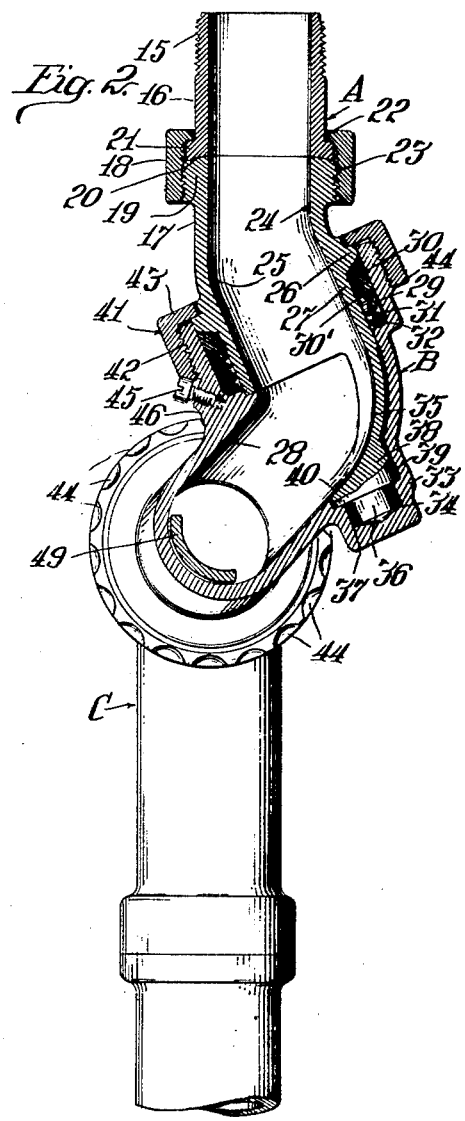
Inventors
Egbert H. Gold
and Edward A. Russell
By Barnett & Truman
Attorneys.

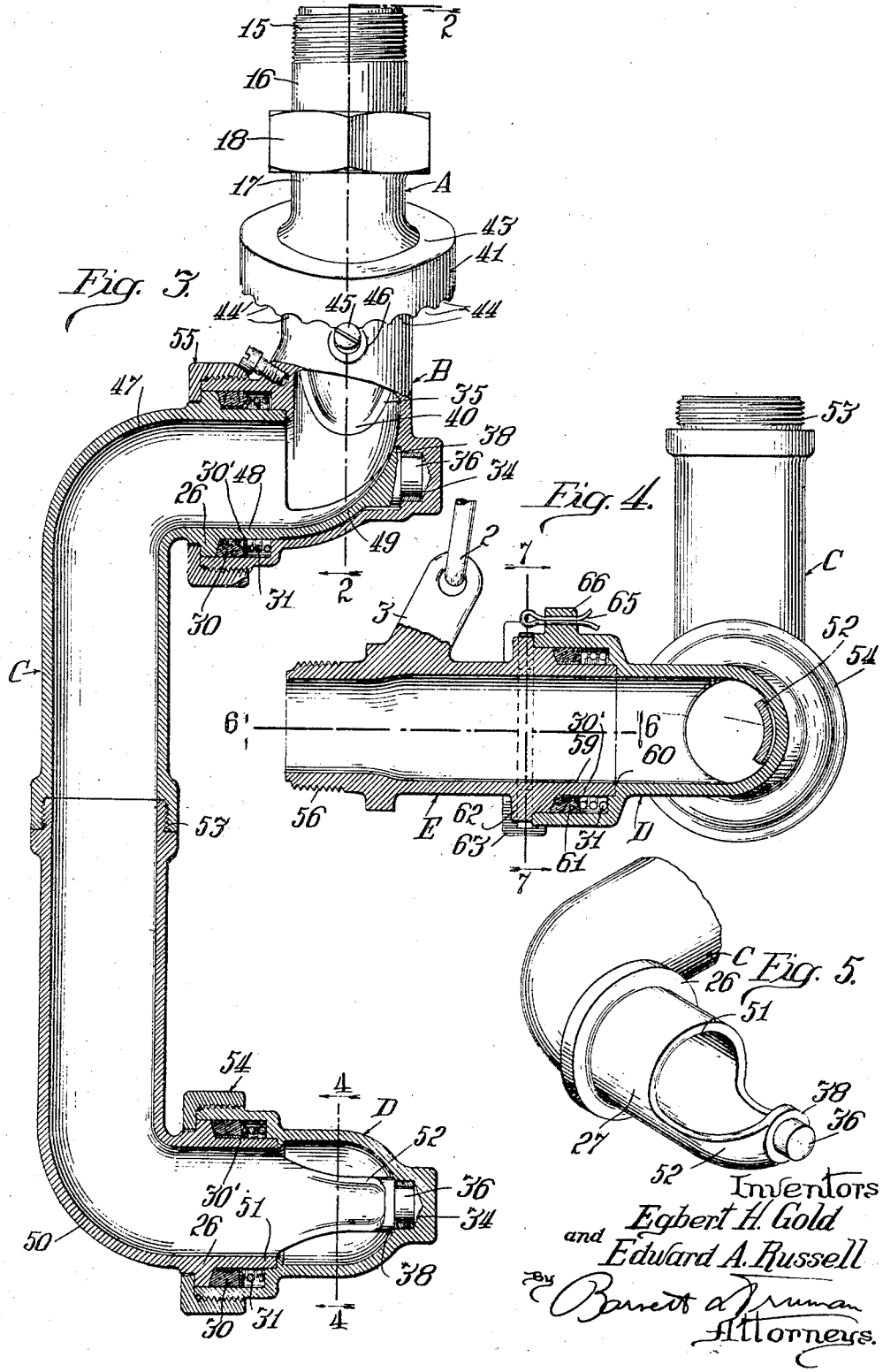

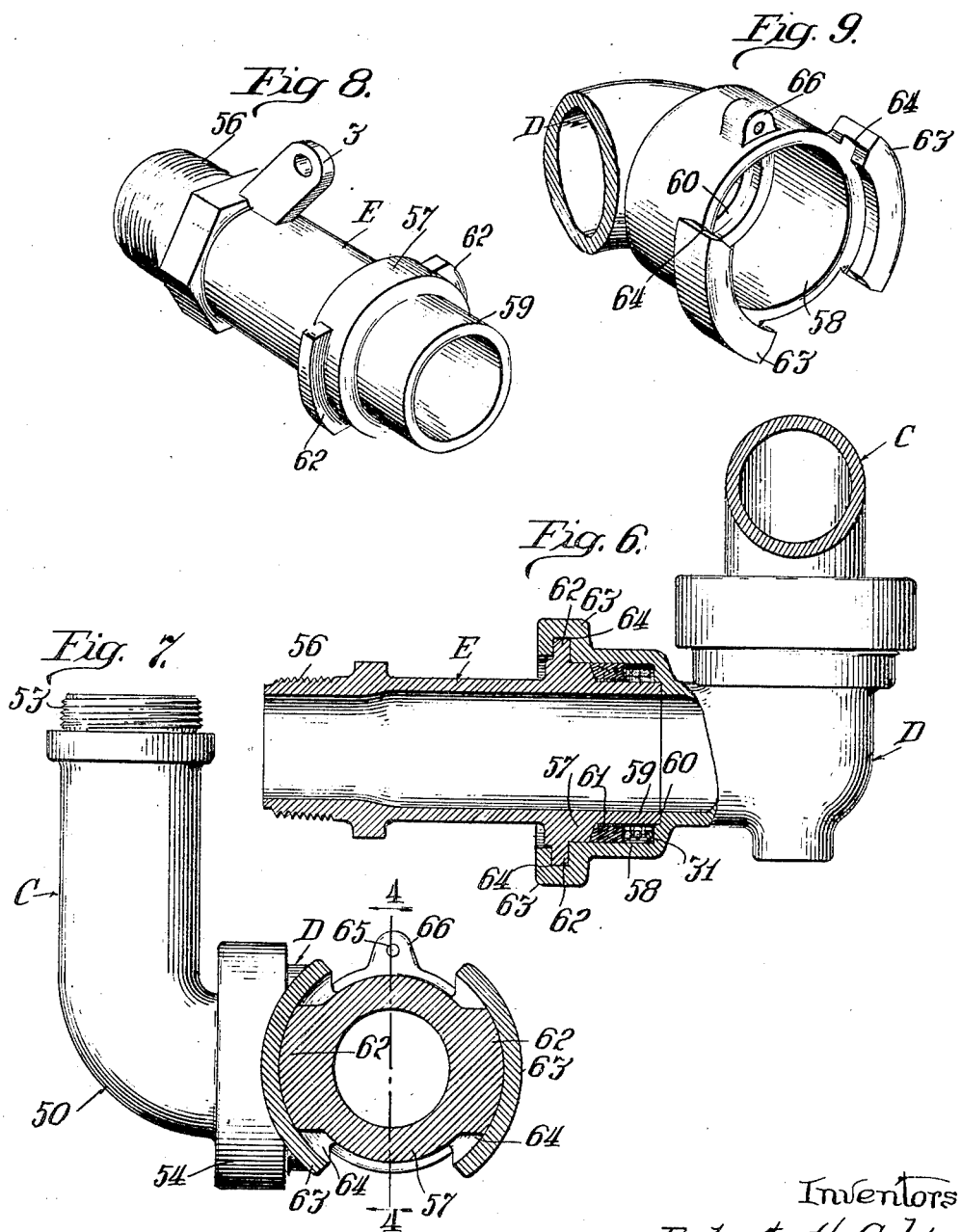

Patented Nov. 11, 1930

1,781,457

UNITED STATES PATENT OFFICE

EGBERT H. GOLD, OF EVANSTON, AND EDWARD A. RUSSELL, OF CHICAGO, ILLINOIS; SAID RUSSELL ASSIGNOR TO VAPOR CAR HEATING COMPANY, INC., OF CHICAGO, ILLINOIS, A CORPORATION OF NEW YORK; MARGARET JAYNE GOLD AND BISCAYNE TRUST COMPANY EXECUTORS OF SAID EGBERT H. GOLD, DECEASED

FLEXIBLE PIPE STRUCTURE

Application filed October 29, 1927. Serial No. 229,755.

This invention relates to a conduit or tubular structure consisting of metal elements flexibly articulated or swiveled together so as to form a fluid-tight connection between the train pipes of the adjacent cars of a railway train, to replace the rubber hoses heretofore used for this purpose. The complete connection consists of two of these flexible structures, one for each of the train pipes to be connected, these structures being coupled together by any suitable form of coupler, such as has been used with the rubber hoses heretofore generally employed for making this connection.

This improved conduit structure consists of a plurality of tubular conduit members, some of which are formed with elbows, the ends of each adjacent pair of members being telescoped one within the other and provided with means for sealing the joint against the escape of steam, without interfering with relative rotation between the members about the axis of the telescoped members. The several elbows and swiveled joints between the members are so arranged that although one end of the flexible structure is rigidly supported from the car train pipe, the coupler mounted at the other end of the structure is permitted a practically universal movement in any direction to allow for the relative movements between the cars and to permit the two couplers to be secured together or disconnected.

The particular object of the present invention is to provide improved means for swiveling the telescoped ends of the conduit members so as to provide increased bearing surfaces and more advantageously support the load. More specifically, one member formed with an elbow adjacent the open end is provided with an inner annular bearing surface near its end, and a bearing socket coaxial with the annular bearing but spaced therefrom is formed within the face of the elbow turn opposite the open end. The end portion of the mating conduit member is swiveled or pivoted within the annular bearing, and has a forwardly projecting portion which is journaled within the socket bearing. This provides two spaced coaxial bearings for the members whereby the twisting strains are distributed, and the conduit structure is rendered stronger, more flexible and more durable.

Other objects and advantages of the invention will be more apparent from the following detailed description of one approved form of apparatus.

In the accompanying drawings:

Fig. 1 is a side elevation of the assembled flexible conduit structure.

Fig. 2 is a vertical section taken substantially on the line 2—2 of Fig. 3.

Fig. 3 is a vertical section taken substantially on the line 3—3 of Fig. 1.

Fig. 4 is a vertical section through the lower horizontally extending end section of the conduit, this view being taken substantially on the lines 4—4 of Figs. 3 and 7.

Fig. 5 is a perspective view of the inner telescoping end portion of one of the conduit members.

Fig. 6 is a plan view of the construction shown in Fig. 4, part of this view being taken in horizontal section substantially on the line 6—6 of Fig. 4.

Fig. 7 is a vertical section taken substantially on the line 7—7 of Fig. 4.

Fig. 8 is a perspective view of the lower horizontal conduit section, detached.

Fig. 9 is a perspective view of the end portion of the lower elbow member, with which the horizontal section shown in Fig. 8 cooperates.

The flexible conduit structure consists of a plurality of rigid conduit members A, B, C, D and E, which are swiveled together, as hereinafter explained in detail. The uppermost conduit member A is adapted to support the entire assembly by being attached to the end of the car train pipe, or more usually to the end train pipe valve, indicated by dotted lines at F in Fig. 1. The coupler member G, which may be of any approved form, is mounted at the free end of the conduit member E at the lower horizontally extending end of the flexible structure. This coupler G is adapted to be mated with a similar coupler of the adjacent car.

A means shown generally at H is provided to support the lower members D, E and G of the structure when disconnected from an adjacent car coupling. In the form here shown, this connection H comprises a turn-buckle 1 having a hook 2 at its lower end engaging with an eye 3 formed on the horizontal conduit member E. An upper link 4 has a hooked end 5 engaging in a bracket arm 6 extending upwardly and outwardly from one side of the upper elbow conduit member B, and projecting over the lower horizontally projecting conduit member E. The lower end of the link 4 is hooked within the closed end of a U-shaped member 7 which projects through a compression spring 8. The lower hooked ends 9 of member 7 engage about an annular washer 10 which forms an abutment for one end of the compression spring 8. A similar washer 11 at the other end of spring 8 is engaged by the hooked ends 12 of a U-shape member 13 similar to member 7. The lower closed end of the member 13 is hooked within the eye 14 at the upper end of turn-buckle 1. This assembled supporting connection is not only sufficiently flexible to permit the necessary movements of the lower horizontally extending conduit members, but the compression spring 8 will also give sufficiently to permit the necessary extension of the conduit structure when the train is rounding curves. It will be apparent from the description which follows that when the coupler G is disconnected from a mating coupler, the supporting means H will hold the assembly C, D, E, and G from swinging backwardly and downwardly about the swiveled joint at the lower end of elbow member B. The rearward inclination of the swiveled joint at the upper end of the elbow B will also tend to prevent the complete conduit assembly from swinging to one side or the other about the upper supporting conduit member A. The entire structure will therefore tend to remain in substantially the position shown in Fig. 1, even though the couplers G are disconnected.

The upper conduit member A is provided with an externally threaded upper end portion 15 whereby it is engaged with the downwardly projecting end of the car train pipe or end train pipe valve, indicated at F. The upper conduit member A will usually be formed of two sections 16 and 17, joined by a coupling collar 18. The lower section 17 is provided at its upper end with an outstanding collar 19 having an upper spherical end surface 20 with which engages a mating concave surface at the lower end of a similar collar 21 on the upper section 16. The coupling collar 18 has an upper inwardly extending flange 22 adapted to engage behind the collar 21, and is interiorly threaded at 23 to engage the threaded outer portion of collar 19. A limited lateral adjustment is permitted between the mating curved end surfaces of the sections 16 and 17 to secure the proper vertical alignment of the conduit structure. Also different upper adapter sections 16 can be substituted for the ones here shown, these sections being curved in one direction or another or provided with different sized end portions 15 in order to adjust the conduit structure to and support same from any type of car train pipe or end valve.

The inner cylindrical wall 24 of the conduit member A is practically continuous from one end of the member to the other to form an unbroken steam passage of constant diameter. The lower portion of conduit A is inclined rearwardly at a slight angle, as indicated at 25 in Fig. 2, for a reason that will be more apparent hereinafter. The member A is provided on its outer surface with an enlarged annular collar 26, and the lower end portion 27 of member A is of reduced external diameter so that the outer surface of this portion 27 and one end of the collar 26 form two walls of the chamber for receiving the sealing means, hereinafter described.

The elbow member B has an inner steam passage 28 of substantially the same circular cross-section as the passage 24 in the member A, so as to form a continuation thereof. The member B is curved successively in planes at substantial right angles to one another so as to form a pair of elbow joints leading directly one from the other. The first elbow joint extends downwardly and forwardly from the connection with upper conduit member A, as best shown in Fig. 2. The second elbow extends laterally from the lower end of the first elbow (as best shown in Fig. 3) to connect with the upper end of the intermediate vertical conduit member C. The upper end of the elbow member B has its bore enlarged, as indicated at 29, to an inner diameter substantially the same as the outer diameter of collar 26 on member A. The outer portion of this surface 29 forms an annular bearing, in which the collar 26 is rotatably journaled. An annular gasket 30 is housed within the annular chamber formed between the bore 29 of member B and the extension 27 of member A. Preferably, an annular metallic ferrule 30' encloses the inner face and bottom of the gasket. A spring 31 confined between one end of the ferrule 30' and the shoulder 32 at the inner end of the enlarged bore 29 serves to force the gasket into engagement with the inner face of collar 26 and to expand the gasket against the surface 27 so as to effectively seal the joint between the members A and B against the escape of steam from within the conduit. A boss 33 is formed on the outer curved portion of the first elbow of member B, and in this boss is formed a bearing socket 34, which is coaxial with the conduit passage in the end portion of members A and B, and with the annular bearing between collar 26 and the bearing surface 29 in member B. An arm or extension 35 projects forwardly from one side of the end 27 of member A, and terminates in a stud 36 journaled in the bearing socket 34. Preferably an antifriction bearing ring 37 is confined between the stud 36 and socket 34. The extension arm 35 has an arcuate cross-section (forming a true continuation of a portion of the end section 27 of member A), so that it will fit snugly against the inner wall of the passage in elbow member B and offer the minimum of obstruction to the continuous passage of steam through the conduit. The end of the arm 35 which carries the stud 36 is enlarged as shown at 38 and housed within an opening 39 in the boss 33 so that the inner surface of portion 38 is substantially flush with the inner surface of the conduit passage in member B, as indicated at 40. It will now be apparent that the annular bearing 29 and the socket 34 form two longitudinally spaced coaxial bearings for the collar 26 and stud 36, respectively, on the conduit member A, the auxiliary socket bearing 34 and stud 36 serving to take up the twisting strains that would ordinarily be thrown upon the main annular bearing between collar 26 and surface 29, so as to materially increase the strength and life of the conduit structure. Furthermore, these spaced coaxial bearings serve to prevent binding and thus materially increase the flexibility of the structure.

In order to hold the members A and B in this assembled relation, a collar 41 is threaded at 42 onto the end portion of member B, and has an inturned upper flange 43 adapted to engage behind the collar 26 on member A. The lower edge portion of the collar 41 is scallopel or indented, as indicated at 44, and a locking screw 45 which is screwed into a boss 46 on elbow member B is engaged in one of these indentations 44 so as to lock the collar 41 in its applied position. Obviously, by removing the locking screw 45 the collar 41 may be unscrewed and the members A and B disassembled in order to renew or adjust the sealing means or for any other reason.

The upper end of the vertical conduit section C is formed with a horizontally projecting elbow portion 47 having an end portion 48 which telescopes within the lower end of the elbow member B. The mating end portions of the conduit members C and B are substantially the same in all respects as the mating portions of members A and B which have just been described in detail, as will be apparent from an inspection of Figs. 2 and 3.

It will be observed that the forwardly projecting arm 49 on member C (corresponding to the arm 35 on member A) projects along the bottom inner surface of the lower elbow in member B so as to impede the passage of steam through the conduit as little as possible. One of the reasons for having the double elbow bend in member B will now be apparent. If only a single elbow were employed, the auxiliary socket bearings 34 for the respective ends of the elbow would interfere with one another, but by employing the two consecutive elbow bends, space is provided in each of the elbows for one of the bearing sockets 34.

The lower end of vertical conduit section C is provided with a second right angled elbow portion 50, the horizontally extending end 51 of which is journaled within one end of the elbow member D in a manner exactly similar to the two swiveled connections already described. It will be noted, however, that the forwardly projecting arm 52 at this end of member C extends from one side of the end portion 51 instead of from the bottom like arm 49 at the upper end of conduit C. This is in order to have this arm extend around the outer bend of the single elbow in member D. It will be noted that the conduit member C is formed of two sections screwed together at an intermediate point 53. The purpose of this is to permit the locking collars 54 and 55 (corresponding to locking collar 41 on conduit A) to be placed on the conduit C behind the bearing collars 26.

The lower horizontal conduit member E is threaded at one end 56 to engage with and support the coupler G. The other end of conduit E is adapted to telescope within and be swiveled to the other end of the lower elbow member D, and since this lower conduit section E is the one which requires most frequent renewal or adjustment, a somewhat more readily detachable connection is provided between the members E and D. Furthermore, since this lower conduit section E is not subjected to the same heavy loads and twisting strains as the other sections, the auxiliary extension bearing which forms the particular subject matter of this invention may be omitted. An enlarged collar 57 has an annular bearing within the enlarged bore 58 at the end of conduit D. The externally reduced end portion 59 of conduit member E has a bearing at 60 against a shoulder formed within the member D, so that a smooth inner conduit surface is formed between the two members. A spring pressed gasket 61, quite similar in all respects to the gasket 30, already described, is confined between the telescoped portions of members E and D. A pair of oppositely extending arcuate lugs 62 are formed on diametrically opposed portions of the collar 57 on member E. Similarly disposed arcuate extensions 63 at the end of elbow member D are interiorly grooved at 64 to receive the arcuate lugs 62. These members form a bayonet joint so that by inserting the end of member E within the end of member D and turning the member E through 90° the lugs 62 may be rotatably secured within the arcuate flanges 63. A certain amount of arcuate movement is necessary between the two members when in service, but a cotter pin 65 inserted through a lug 66 on member D will engage either one or the other of the lugs 62 to prevent sufficient rotation of member E to permit the members to become disengaged. It will be apparent that the member E and the coupler G carried thereby may be quickly removed by merely taking out the cotter pin 65 and rotating member E through 90°.

It will now be apparent that the four swiveled connections between the sections A, B, C, D and E, permit rotative movements in three different planes at substantial right angles with one another so that any necessary rotative or translatory movements are permitted the coupler G. It will be noted that when unsupported by connection with an adjacent car, the members C, D, E and G would tend to swing downwardly and backwardly in the plane of the paper, as shown in Fig. 1. This movement is prevented by the suspension device H carried at its upper end by the elbow member B. This entire assembly, including the member B, is free to swing substantially horizontally about the vertical member A, but due to the backward inclination of the lower end of member A and the consequent tilting of this upper plane of rotation, any lateral swinging movements of the assembly just described would have to carry the supported members bodily upward to some extent so that there will be a tendency for the assembly to remain in the normal position shown in Fig. 1. The backward tilting of this upper joint also makes a more compact assembly and brings the center of gravity of the supported conduit assembly more nearly under the supporting structure F.

It will be noted that although there are several curves in the stream passage through this conduit structure, the passage has a practically continuous and unbroken surface and is of substantially constant diameter from end to end of the structure. The only obstructions are caused by the projecting arms 35, 49 and 52 which extend to the auxiliary side bearings, and these arms are formed so as to conform as nearly as possible to the walls of the passage. The passage throughout this improved conduit structure is practically continuous and offers little resistance to the passage of the steam.

Each of the three main bearings where material loads are supported, and which are subjected to considerable twisting strains is provided with the auxiliary, longitudinally spaced, coaxial socket bearings whereby, as explained hereinabove in detail, the strength, durability and flexibility of the conduit structure are greatly increased.

We claim:

1. In a flexible conduit structure, a pair of conduit sections, one of which is formed with an elbow portion adjacent one end of the section, there being an annular bearing in this end of the section in which the end portion of the other section is rotatably engaged, there being an extension projecting inwardly from one side portion of the rotatable section adjacent one inner wall of the elbow, and a bearing formed in the wall of the elbow opposite the open end of the section for the end portion of this extension.

2. In a flexible conduit structure, a pair of conduit sections, one of which is curved to provide an elbow portion adjacent its end, and is provided interiorly with an annular bearing and a bearing socket formed in the wall of the elbow opposite the open end of the section, the two bearings being coaxial but spaced apart longitudinally of the conduit, the other conduit member having its end portion telescoped within the first member and journaled in the annular bearing, and having an extension projecting inwardly along one inner wall of the elbow with its end portion journaled within the socket.

3. In a flexible conduit structure, a pair of conduit sections, one of which is curved to provide an elbow portion adjacent its end, and is provided interiorly with an annular bearing and a bearing socket formed in the elbow, the two bearings being coaxial but spaced apart longitudinally of the conduit, the other conduit member having its end portion telescoped within the first member and journaled in the annular bearing, and having a curved arm projecting forwardly into the elbow and fitting snugly against the inner surface of the first mentioned conduit member, the end of the arm being formed with a stud journaled within the socket.

4. In a flexible conduit structure, a pair of conduit sections, one of which is curved to provide an elbow portion adjacent one end, this end being enlarged interiorly to provide an annular bearing surface of greater inner diameter than the interior of the joint, there being a bearing socket formed in the inner wall of the elbow portion opposite the open end of the section and coaxial with the first mentioned annular bearing, the other conduit member having its end portion telescoped within the end of the first member and provided with an outwardly projecting collar journaled in the annular bearing, a packing means confined between one side of the collar and the inner end of the enlarged portion of the first conduit member, the second mentioned conduit member also having a forwardly projecting curved arm which extends into the elbow closely adjacent the inner surface of one wall of the elbow and is journaled at its end in the socket, and thrust-receiving means to prevent separation of the conduit sections.

5. In a flexible conduit, a pair of hollow conduit sections, a third conduit section formed with inner annular bearings at its ends in which the ends of the other sections are rotatably mounted, the third section being formed with two consecutive elbow bends curved in planes at substantially right angles with one another, there being a bearing formed in each elbow in coaxial alignment with the annular bearing at the adjacent end of the section, and members projecting from the respective ends of the first two members and journaled in the elbow-bearings.

6. In a flexible conduit, a pair of hollow conduit sections, a third conduit section formed with inner annular bearings at its ends in which the ends of other sections are rotatably mounted, the third section being formed with two consecutive elbow bends curved in planes at substantial right-angles with one another, there being a socket formed in each elbow in coaxial alignment with the annular bearing at the adjacent end of the section, and curved arms on the ends of the first two members projecting into the elbow bends and conforming to the inner curved surface of the elbow and terminating in journals pivoted in the sockets.

7. In a flexible conduit structure, an upper vertically extending conduit member having a rearwardly inclined lower end, an upper elbow conduit section formed with two consecutive elbow turns one extending downwardly and forwardly and the other laterally, the rearwardly inclined end of the upper conduit member being journaled within the upper end of the elbow member, an intermediate vertical conduit member having laterally extending elbow bends at its upper and lower ends, the upper end being journaled in the laterally extending elbow of the upper elbow conduit member, a lower elbow conduit member in one end of which the lower laterally turned end of the vertical conduit is journaled, a horizontally extending conduit section journaled at one end in the other end portion of the lower elbow conduit, and an auxiliary flexible supporting connection extending from the upper elbow conduit to the horizontally extending conduit member.

8. In a flexible conduit structure, a pair of conduit sections, one of which is formed at one end with an elbow portion, the open end of the elbow being interiorly enlarged to form a bearing surface, the opposite wall of the elbow being formed interiorly with a bearing socket coaxial with the end bearing surface, the other conduit member telescoping within the open end of the elbow and having an outwardly extending annular collar journaled within the end bearing surface and also having a curved extension projecting along one inner wall of the elbow so as not to obstruct the conduits and terminating in a stud journaled within the socket, a removable flanged collar mounted on the end of the elbow and extending behind the annular collar, and a packing means confined within the elbow and engaging the conduit sections and one side wall of the annular collar.

9. In a flexible conduit structure, a pair of conduit sections, one of which is formed at one end with an elbow portion, the open end of the elbow being provided interiorly with a bearing surface, and the opposite wall of the elbow being formed interiorly with a bearing socket coaxial with the bearing surface, the other conduit member telescoping within the open end of the elbow and being journaled within the bearing surface and having a curved extension projecting along one inner wall of the elbow so as not to obstruct the conduits and terminating in a stud journaled within the socket and thrust-receiving means to prevent separation of the telescoped conduits.

EGBERT H. GOLD.
EDWARD A. RUSSELL.